US007813033B1

(12) United States Patent
Blanding et al.

(10) Patent No.: US 7,813,033 B1
(45) Date of Patent: Oct. 12, 2010

(54) CONNECTING STRUCTURES COMPRISING HEATED FLEXURES AND OPTICAL PACKAGES INCORPORATING THE SAME

(75) Inventors: Douglass L Blanding, Painted Post, NY (US); Garrett Andrew Piech, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/424,142

(22) Filed: Apr. 15, 2009

(51) Int. Cl.
*G02F 1/37* (2006.01)
*F16D 1/00* (2006.01)
(52) U.S. Cl. .......................... 359/328; 403/28; 359/326
(58) Field of Classification Search ......... 359/326–332; 403/28
See application file for complete search history.

(56) References Cited

U.S. PATENT DOCUMENTS

| | | | | |
|---|---|---|---|---|
| 5,004,205 A | * | 4/1991 | Brown et al. | 248/476 |
| 6,456,766 B1 | | 9/2002 | Shaw et al. | 385/47 |
| 6,661,962 B1 | * | 12/2003 | Calvet et al. | 385/137 |
| 2002/0065600 A1 | | 5/2002 | Oka et al. | 701/200 |
| 2003/0019838 A1 | | 1/2003 | Shaw et al. | 216/20 |
| 2005/0123266 A1 | * | 6/2005 | Calvet et al. | 385/147 |

OTHER PUBLICATIONS

"An improved in-plane thermal folded V-beam actuator for optical fibre alignment", Sassen et al; Journal of Micromechanics and Microengineering; 2008; p. 1-9.
"In-package MEMS-based thermal actuators for micro-assembly"; Henneken et al; Journal of Micromechanics and Microengineering; 2006; p. S107-S115.

* cited by examiner

*Primary Examiner*—Daniel Petkovsek
(74) *Attorney, Agent, or Firm*—Kwadjo Adusei-Poku

(57) ABSTRACT

Particular embodiments of the present invention relate generally to connecting structures comprising heated flexures for aligning a first component with a second component. According to one embodiment of the present invention, an optical package includes a laser, a wavelength conversion device, a mirror and a connecting structure. The mirror reflects a laser beam such that the laser beam is incident upon the wavelength conversion device. The connecting structure includes a structure base and three bipod flexures. Each of the bipod flexures includes first and second bipod legs extending from the structure base to the mirror. A heating element is thermally coupled to the first and second bipod legs. The bipod flexures are arranged in a tripod configuration such that changes in the length of the bipod legs alter the reflection of the laser beam from the mirror.

11 Claims, 9 Drawing Sheets

CONNECTING STRUCTURES COMPRISING HEATED FLEXURES AND OPTICAL PACKAGES INCORPORATING THE SAME

BACKGROUND

1. Field

The present invention generally relates to structures for the alignment of the components of a mechanical assembly, such as an optical package. More specifically, some embodiments of the present invention relate to optical packages and the alignment of components thereof such that an output beam of a laser is positioned upon a waveguide input of a wavelength conversion device.

2. Technical Background

In many applications, there is a need for extremely accurate mechanical connection between components of an assembly. For example, accurate optical coupling is required in the assembly of component parts of a frequency doubled green laser apparatus or system. In such an application, a nonlinear optical crystal, such as a Mg—O doped periodically poled lithium niobate (PPLN) crystal, is used to convert the infrared light emission of a laser into visible green light. Both the diode laser and nonlinear optical crystal use single mode waveguide structures to confine and guide the light energy. In such a green laser application, there is a need for the components of the assembly to be maintained in rigid alignment such that the output beam of the laser is precisely aligned with the very small waveguide input that is located on an input face of the waveguide crystal. Waveguide optical mode field diameters of typical second harmonic generating (SHG) crystals, such PPLN crystals, can be in the range of a few microns. As a result, the present inventors have recognized that it can be very challenging to properly align and focus the output beam from the laser diode with the waveguide of the SHG crystal, particularly during assembly of the optical package.

Tolerances on the alignment of the laser and nonlinear crystal waveguides may be between 300 nm and 500 nm (for 5% degradation in coupling) in the plane perpendicular to the optical axis. The tolerance along the direction of the optical axis may be significantly looser, between about 3 µm and 4 µm. Therefore, the slightest misalignment between the laser output beam and the waveguide input may result in reduced coupling of the infrared energy and result in a loss of green output power.

Generally, there are two strategies to aligning the components in the green laser assembly: a passive alignment approach and an active alignment approach. In the passive alignment approach, a permanent attachment technique, such as laser welding or UV cured adhesive, is utilized to achieve a rigid, accurate attachment between components of the green laser. With regard to laser welding, due to weld heating and stresses, post-weld part shifts occur and it is difficult to achieve assembly accuracy better than about 1 µm. The requirements of the green laser assembly require an order of magnitude better accuracy (positional accuracy on the order of 0.1 µm is needed). UV cured adhesives make achieving assembly accuracy of approximately 0.1 µm possible, but such adhesives are susceptible to swelling due to heat and humidity. The stability of the components relative to one another must be maintained to a few tenths of a micron over the lifetime of the laser and a wide range of environmental conditions (e.g., +10° C. to +60° C., up to 85% relative humidity).

In an active alignment approach, an adjustable active component is used to insure that the infrared energy from the laser is accurately aligned with the small input of the crystal waveguide. Because of this adjustability, the requirements for alignment of the various component parts of the device can be relaxed by an additional order of magnitude or so, allowing the components to be assembled to much more relaxed positional tolerances, on the order of tens or hundreds of microns. The active component or components may also be used to accommodate alignment changes during the life and operation of the laser. The downside of the active alignment approach is the active component itself. Typically, an active component is either a piezo-electric actuator or micro-electro-mechanical (MEMS) mirror device, which adds cost to the entire package, and reduces the overall reliability. Such devices can be susceptible to breakage during assembly, failures from environmental exposure, and shock induced damage.

BRIEF SUMMARY

According to one embodiment, an optical package including a laser, a wavelength conversion device, a mirror and a connecting structure is provided. The laser is configured to emit a laser beam incident upon the mirror. The mirror is configured to reflect the laser beam such that the laser beam is incident upon an input facet of the wavelength conversion device. The connecting structure includes a structure base and three bipod flexures. Each of the bipod flexures includes first and second bipod legs extending from the structure base to the mirror and a heating element thermally coupled to the first and second bipod legs. Heat generated by the heating element changes the length of the bipod legs. The bipod flexures are arranged in a tripod configuration such that changes in the length of the bipod legs of the three bipod flexures alter the reflection of the laser beam from the mirror.

According to another embodiment, a connecting structure includes three bipod flexures, a first component and a second component. Each of the bipod flexures includes first and second bipod legs extending from the first component to the second component and a heating element thermally coupled to the first and second bipod legs such that heat generated by the heating element changes the length of the bipod legs. The bipod flexures are arranged in a tripod configuration such that changes in the length of the bipod legs of respective ones of the three bipod flexures alter the position of the first component with respect to the second component.

According to yet another embodiment, a connecting structure for rigidly connecting a first component to a second component is provided. The connecting structure couples the first component to the second component such that no freedom of motion exists between the first and second components. The connecting structure comprises a plurality of members having a selectively controllable length configured to produce a change in the position of the first component with respect to the second component upon the application of heat to the plurality of members.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
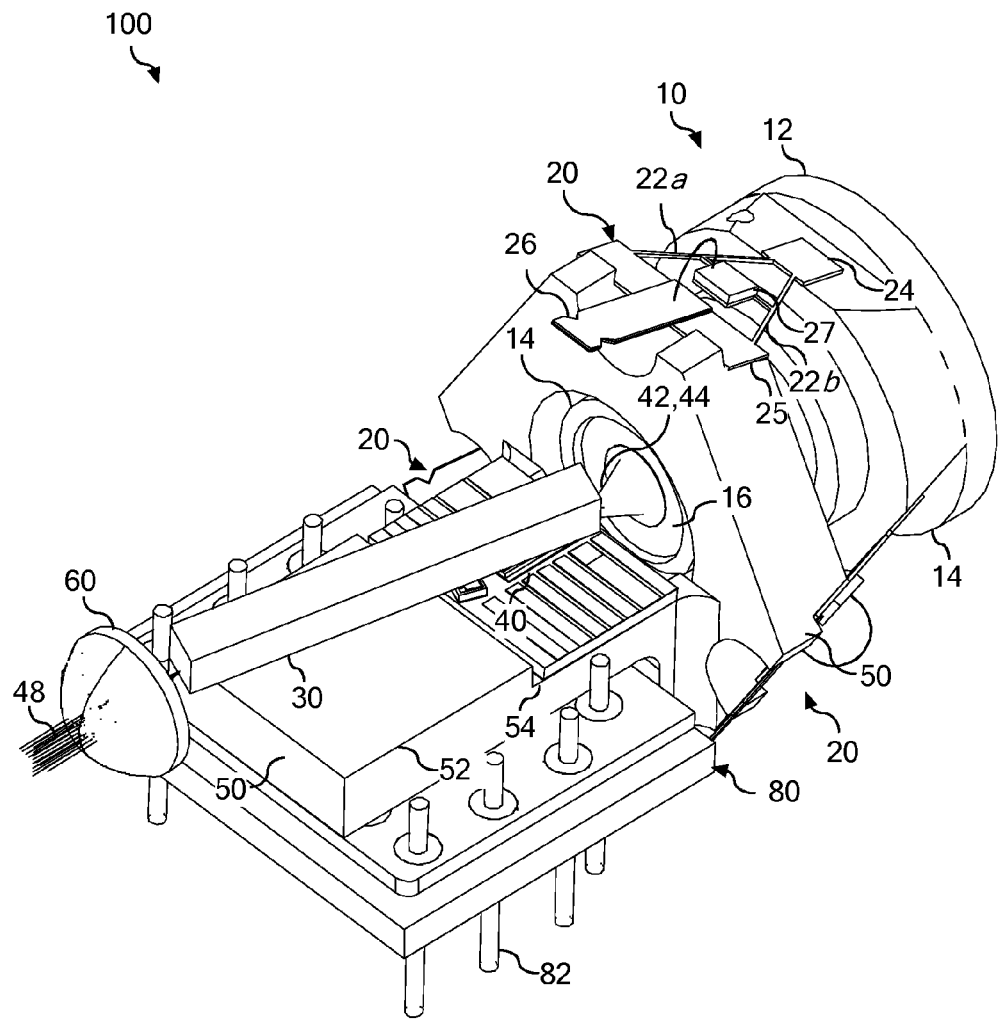
FIG. 1 is an illustration of an exemplary optical package according to one or more embodiments of the present disclosure.

Referring initially to FIG. 1, connecting structures comprising members configured as heated flexures may be utilized to rigidly and precisely couple a first component to a second component. Although embodiments described herein are described in the context of green laser optical packages, the connecting structures and heated flexures described herein may be utilized in other applications that require fine alignment between components. Although the general structure of the various types of optical packages in which the concepts of particular embodiments of the present invention can be incorporated is taught in readily available technical literature relating to the design and fabrication of frequency or wavelength-converted semiconductor laser sources, the concepts of particular embodiments of the present invention may be conveniently illustrated with general reference to an optical package 100 including, for example, a light source 40, such as a semiconductor laser, and a wavelength conversion device 30. The optical package 100 illustrated in FIG. 1 is particularly useful in generating a variety of shorter wavelength laser beams from a variety of longer wavelength semiconductor lasers and can be used, for example, as a visible laser source in a laser projection system.

Figure 3:
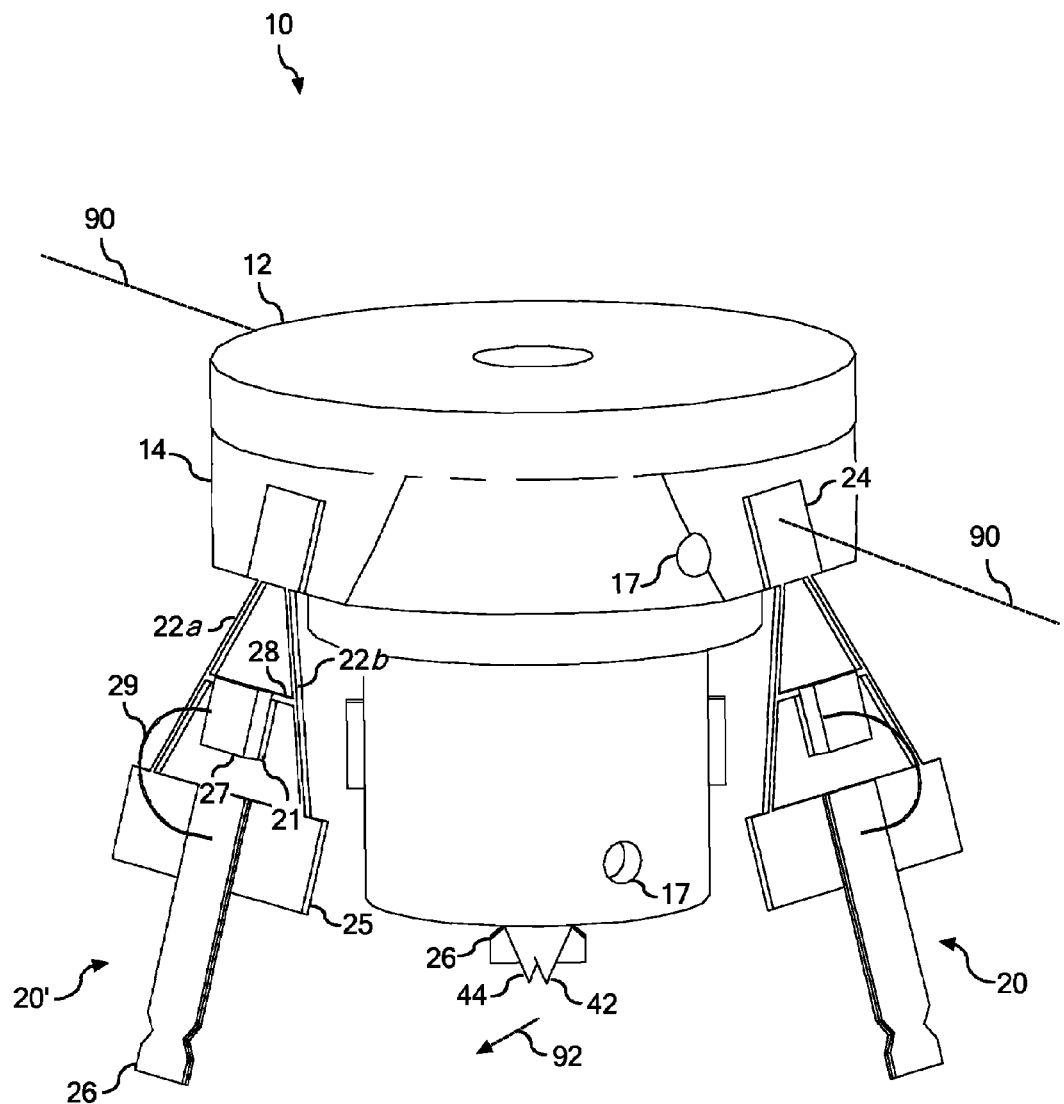
FIG. 3 is an illustration of an exemplary mirror and lens housing assembly and an exemplary connecting structure according to one or more embodiments of the present disclosure.
Figure 4:
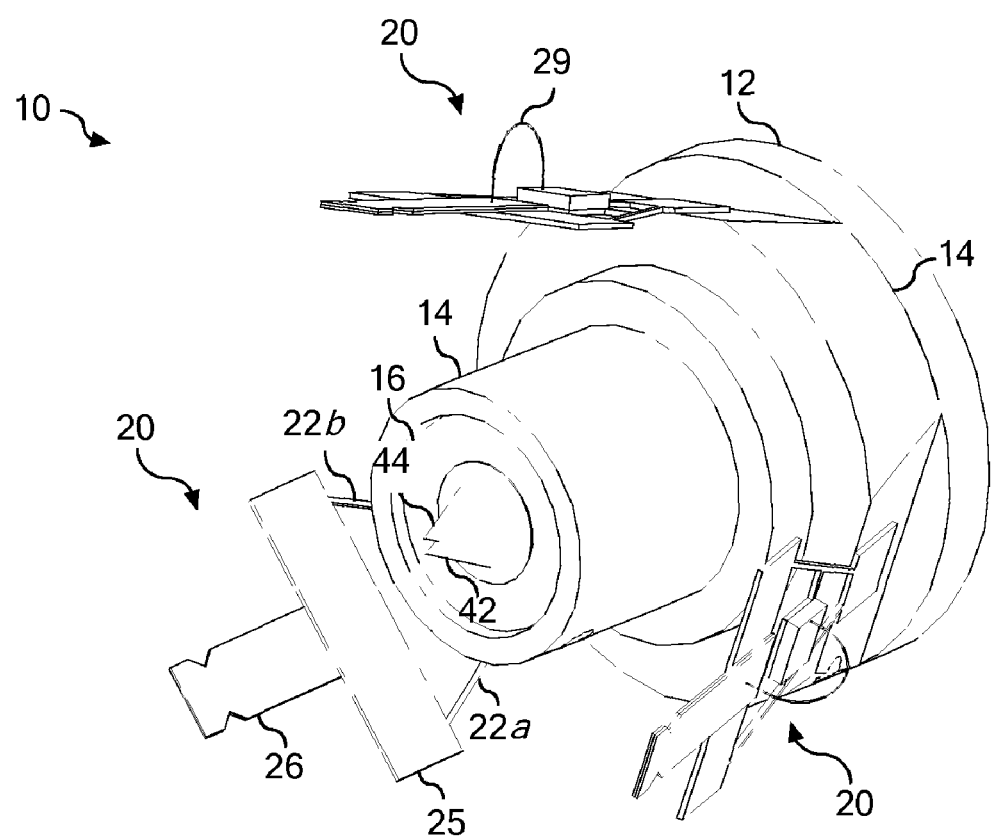
FIG. 4 is an illustration of an exemplary mirror and lens housing assembly and an exemplary connecting structure according to one or more embodiments of the present disclosure.

Generally, a connecting structure of the present disclosure comprises a plurality of heated flexures 20 and a structure base 50. The heated flexures of the embodiment illustrated in FIGS. 1, 3 and 4 are configured as bipod flexures 20 having bipod legs 22a and 22b. It is understood that the heated flexures are not limited to this bipod configuration as other configurations are possible (e.g., the triangular flexure 120 illustrated in FIG. 10). The heated flexures 20 may be arranged in a tripod configuration about the aligned components. The heated flexures 20 may be arranged about the components to provide for rigid alignment such that no freedom of motion exists between the first and second components. The connecting structure may be used to precisely align the output beam of a laser 40 with a waveguide input positioned on an input facet of a wavelength conversion device 30. The heated flexures 20 comprise low-power heating elements that effect minute dimensional changes on the flexures connecting the optics (e.g., a mirror) to the laser 40 and wavelength conversion device 30. As will be described in more detail below, the motions of the heated flexures 20 may steer the infrared optical beam emitted by the laser 40, thereby allowing active control of its position upon the input facet of the wavelength conversion device 30 (and the waveguide input thereon). By controlling the heated flexures 20 with closed-loop feedback, the heated flexures 20 may be used to compensate for both assembly and environmentally (e.g., temperature and humidity) induced misalignment with low power consumption and high reliability.

Although some embodiments of the connecting structure disclosed herein are described and illustrated as a plurality of independent heated flexures, it is to be understood that embodiments of the present disclosure are not limited thereto. Embodiments of the present disclosure may comprise a unitary connecting structure wherein the heated flexures 20 are connected to one another rather than separate components.

The laser 40 may comprise one or more lasers or coherent light sources, such as distributed feedback (DFB) lasers, distributed Bragg reflector (DBR) lasers, vertical cavity surface-emitting lasers (VCSEL), or vertical external cavity surface-emitting lasers (VECSEL), for example. The wavelength conversion device, such as a second harmonic generating (SHG) crystal or a higher harmonic generating crystal, may be used to frequency-double an output beam emitted by the laser 40 having a native wavelength in the infrared or near-infrared band. For example, a SHG crystal, such as a MgO-doped periodically poled lithium niobate (PPLN) crystal, may be used to generate green light by converting the wavelength of a 1060 nm DBR or DFB laser to 530 nm.

Referring to the embodiment illustrated in FIG. 1, the laser 40 and wavelength conversion device 30 may be rigidly coupled to a structure base 50. The structure base 50 may be rigidly attached to another mounting surface (not shown) such as a printed circuit board via through-hole mounting assembly 80 and pins 82. The connecting means used to connect the structure base 50 to the mounting surface is not limited to a through-hole configuration and may also include other connecting means, such as flexible or rigid circuit connections or surface mount technology, for example.

In the illustrated embodiment, the wavelength conversion device 30 is rigidly coupled to a first surface 52 of the structure base 50, while the laser 40 is rigidly coupled to a lower second surface 54 such that the wavelength conversion device 30 is positioned above the laser 40. The spatial modes of the laser 40 and the wavelength conversion device 30 of this embodiment are asymmetric with respect to the x and y directions (see FIG. 8).

Figure 2:
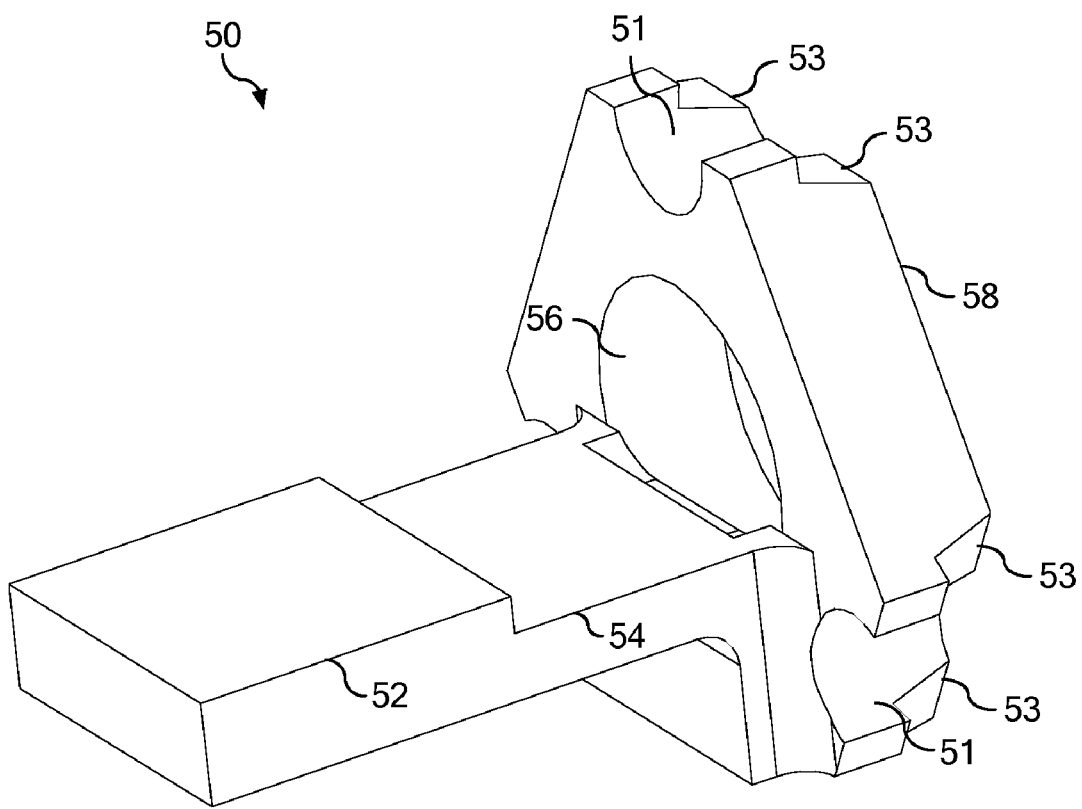
FIG. 2 is an illustration of an exemplary structure base according to one or more embodiments of the present disclosure.

Referring now to FIG. 2, the structure base 50 may have two substantially horizontal portions 52 and 54 and a substantially vertical portion 58. In other embodiments, the structure base 50 may comprise two or more individual components, such as horizontal portions 52 and 54 being one component and the vertical portion 58 being a separate component. The vertical portion 58 may further comprise a hole 56 in which portions of a mirror and lens housing assembly 10 may be positioned. Referring to FIG. 2 in conjunction with FIG. 1, the vertical portion 58 may further have several flexure mounting shelves 53 to which a mounting tab 25 of the bipod flexures 20 may be attached. The vertical portion 58 of the structure base 50 may also comprise several notches 51 to provide clearance for an electrical power tab 26 assembly of the bipod flexure 20 embodiment. It is noted that the structure base 50 may have many other configurations and is not limited to the illustrated embodiment.

FIGS. 3 and 4 illustrate a mirror and lens housing assembly 10 having a connecting structure comprising a plurality of heated flexures configured as bipod flexures 20 having first and second bipod legs 22a and 22b coupled thereto. The mirror and lens housing assembly 10 of the illustrated embodiment includes a mirror and lens housing 14 and a cap 12 that covers a face of the mirror and lens housing 14. The mirror and lens housing assembly 10 is adjustably connected to the structure base 50 via the bipod flexures 20 that are positioned around the perimeter of the mirror and lens housing 14. As described in more detail below, the bipod flexures 20 may be attached to the mirror and lens housing 14 at 120 degree intervals by the use of a mounting tab 24. It is contemplated that more than one mounting tab may be utilized and, in another alternative, no mounting tab may be used. For example, the bipod legs 22a and 22b may coupled directly to the mirror and lens housing 14.

Figure 5A:
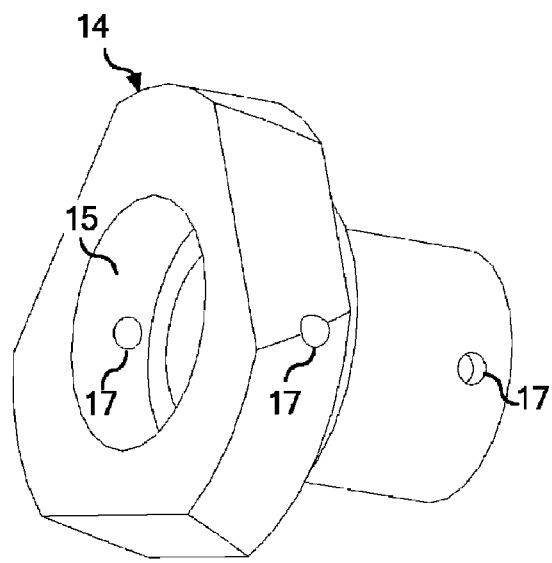
FIG. 5A is an illustration of an exemplary mirror and lens housing according to one or more embodiments of the present disclosure.
Figure 5B:
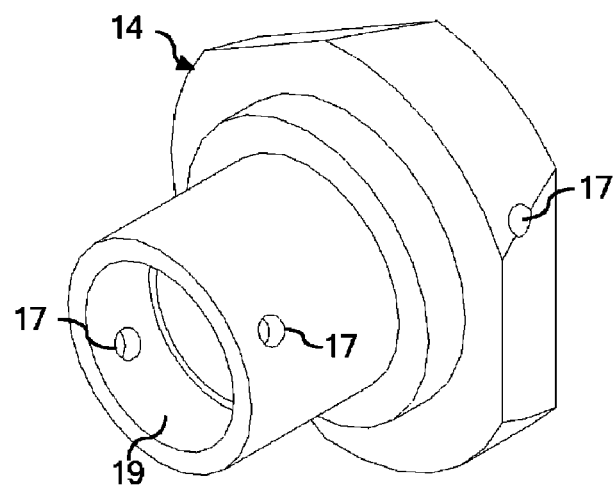
FIG. 5B is an illustration of an exemplary mirror and lens housing according to one or more embodiments of the present disclosure.

The mirror and lens housing 14 may be configured as having two cylindrical or semi-cylindrical portions that form a lens recess 19 (FIG. 5B) and a mirror recess 15 (FIG. 5A). As viewed in FIGS. 1 and 4, the lens recess portion 15 of the mirror and lens housing 14 may be positioned within the hole 56 of the vertical portion 58 of the structure base 50 such that there is play for the mirror and lens housing 14 to move within the hole 56. The output beam 42 generated by the laser 40 may be directed through the hole 56 and into the mirror and lens housing 14.

Referring to FIGS. 5A-8, the mirror and lens housing 14 is configured to rigidly couple a lens 16 to a mirror 18. The lens 16 may be secured within the lens recess 19 and the mirror 18 may be secured within the mirror recess 15 of the mirror and lens housing 14 by the application of glue through holes 17 or by welding. The arrangement of the lens 16 and mirror 18 is not limited to the configuration of the mirror and lens housing 14 as other arrangements and alternatives are possible. In another embodiment the bipod flexures 20 (or triangular flexures illustrated in FIG. 10 and described below) may be coupled directly to the mirror (i.e., the mirror 18 is integral with the mirror and lens housing 14).

Figure 6:
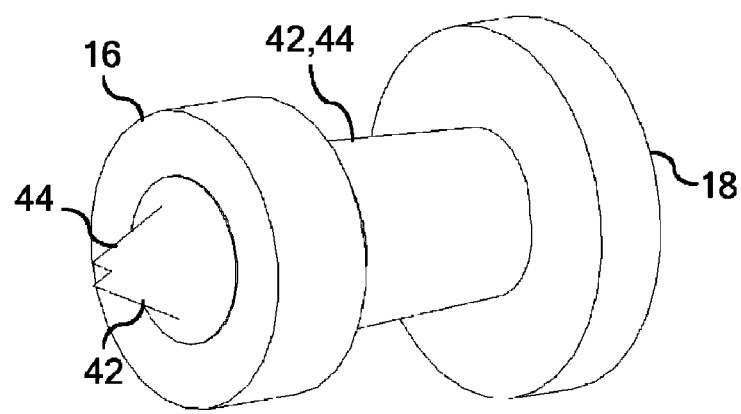
FIG. 6 is an illustration of an exemplary lens and an exemplary mirror according to one or more embodiments of the present disclosure.
Figure 7:
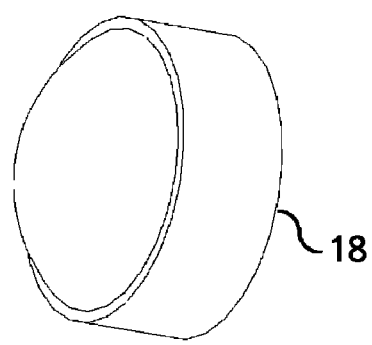
FIG. 7 is an illustration of an exemplary lens according to one or more embodiments of the present disclosure.
Figure 8:
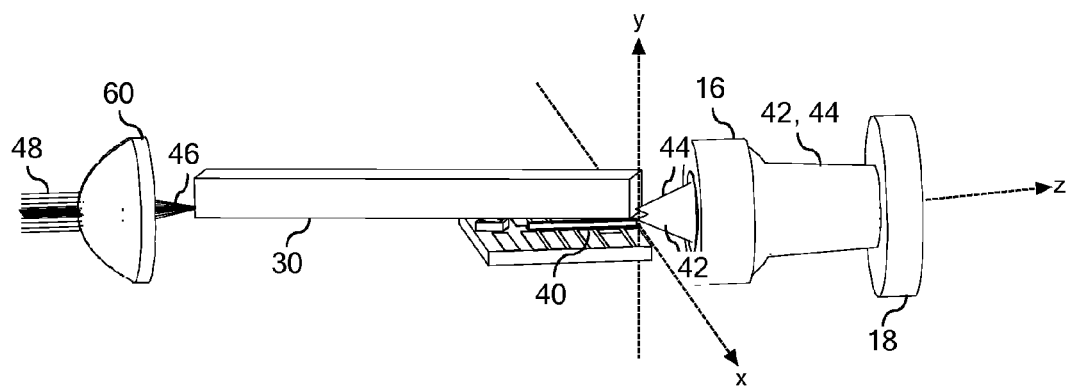
FIG. 8 is an illustration of an exemplary optical path of a laser beam according to one or more embodiments of the present disclosure.

As illustrated in FIG. 6, the lens 16 and mirror 18 are arranged and configured such that the divergent output beam 42 emitted by the laser 40 is collimated by the lens 16 and directed toward the mirror 18. The collimated output beam then reflects off of the mirror 18 and is refocused by the lens 16 such that it exits the mirror and lens housing 14 and hole 56 of the structure base 50 as refocused and redirected beam 44. In this manner, the lens 16 refocuses the beam 44 onto the input facet of the wavelength conversion device 30. Referring specifically to FIG. 8, the redirected output beam 44 enters the wavelength conversion device 30 at the waveguide input such that the infrared beam 44 is converted to a higher frequency and exits the wavelength conversion device 30 as a divergent green beam 46. A collimating lens 60 may be provided in an optical path after the wavelength conversion device 30 to prepare the converted green beam 46/48 for further redirection, scanning, or whatever further actions are to be taken in accordance with the application in which the optical package 100 is operating.

Referring again to FIGS. 1 and 3, three bipod flexures 20 are arranged in a tripod configuration to provide rigid and adjustable attachment of the mirror and lens housing 14 (and the mirror 18 and lens 16 positioned therein) to the structure base 50. As described above and in more detail below, the bipod flexures 20 comprise bipod legs 22a and 22b that change in length with the application of heat. The bipod flexures 20 have one or more first mounting tabs 24 and one or more second mounting tabs 25 that provide attachment means to the mirror and lens housing 14 and structure base 50. According to the illustrated embodiment, two bipod legs 22a and 22b extend from a mounting tab 24 attached to the mirror and lens housing 14. In an alternative embodiment, the mirror 18 may not be retained within a housing, and the bipod legs 22a and 22b may be attached directly to the mirror 18, or the mirror 18 may be integral with the mirror and lens housing 14.

The bipod legs 22a and 22b of each bipod flexure 20 extend toward a second mounting tab 25 that is attached to the structure base 50 via a flexure shelf 53 located on the vertical face 58 of the structure base 50. In an alternative embodiment, two second mounting tabs 25 may be utilized rather than one, or some embodiments may not comprise any mounting tabs such that the bipod legs 22a and 22b are attached directly to the structure base 50. It is also contemplated that the bipod legs 22a and 22b may extend outwardly from the structure base 50 toward the mirror and lens housing 14.

Still referring to FIGS. 1 and 3, the bipod flexures 20 further comprise a heating element 27 that is positioned between the bipod legs 22a and 22b. The heating element 27, which may be a resistor, may be attached upon a heating element tab 21 that is thermally coupled to the bipod legs 22a and 22b via a connector 28, which may be a wire or a thin film structure. A power tab 26 may be attached to the second mounting tab 25 (or, in an alternative embodiment, the first mounting tab 24). Power tab 26 may have a laminated construction comprising an electrically insulative under layer and an electrically conductive top layer. Wire 29 electrically couples electrical current from power tab 26 to the heating element 27. The current then flows through the bipod flexure 20 and into the common ground of the mirror and lens housing 14 and the structure base 50. As described in detail below, heat generated by the heating element 27 flows from the heating element 27 to the middle of each bipod leg 22a and 22b.

Assembly and alignment of the components of an optical package may be accomplished by adjusting the x/y/z position of the mirror and lens housing assembly 10 using a precision 3-axis stage until high coupling is achieved between the two waveguides of the laser 40 and the wavelength conversion device 30. As previously stated above, typical tolerances on the alignment of optics relative to the diode and crystal may be approximately 300-500 nm (for 5% degradation in coupling) in the plane perpendicular to the optical axis of the lens and approximately 3-4 µm along the direction of the optical axis.

As described above, the connecting structure comprising the structure base 50 and the three bipod flexures 20 oriented at 120 degree intervals about the optical axis is used to rigidly hold the mirror and lens housing assembly 10 to the structure base 50 (and therefore the laser 40 and wavelength conversion device 30 mounted upon the structure base 50). It is noted that the connecting structure may comprise more or less than three heated flexures depending on the application in which the heated flexures are to be utilized. Further, although FIGS. 1, 3 and 4 depict connecting structures having three heated flexures arranged symmetrically about the mirror and lens housing 10 and structure base 50 in a tripod configuration, it is understood that the heated flexures may be arranged in an asymmetric configuration.

In operation, if the mirror and lens housing assembly 10, laser 40 and wavelength conversion device 30 are correctly positioned during assembly, and if all components are stable over the lifetime of the optical package 100, then no further adjustment may be needed. However, if adjustment is needed, current or voltage may be provided to the bipod flexures 20 to adjust the position of the mirror and lens housing assembly 10 with respect to the structure base 50. In order to facilitate adjustment, electrical current supplied to the heating elements 27 positioned between the bipod legs 22a and 22b of the bipod flexures 20 causes the individual bipod legs 22a and 22b to lengthen.

As is illustrated by FIG. 3, by sending current to the heating element 27 of a selected flexure member (e.g., bipod flexure 20'), the mirror and lens housing assembly 10 rotates about a line 90 joining the vertices of the other two bipod flexures 20. This rotation causes the focal point of the lens 16 and the focused beam spot to move toward the heated bipod flexure 20' as indicated by arrow 92, but still largely without any motion of the focused beam spot in the direction along the optical axis. The amount of rotation produced is determined at least in part by the distance between the heated bipod flexure 20 and the rotation axis 90. For example, in the embodiment illustrated in FIG. 3, the focal point of the lens 16 may move approximately 1.5 μm at the input facet of the wavelength conversion device 30 for 1 μm of bipod leg 22a, 22b expansion.

By monitoring the amount of optical power exiting the wavelength conversion device 30, a closed-loop feedback system may be utilized control the position of the laser 40 and wavelength conversion device 30 to keep it optimally aligned with the mirror and lens housing assembly 10, even while being subjected to wide ranges of ambient temperature, humidity and/or mechanical loads. The bipod flexures 20 respond quickly upon receiving electrical voltage or current from the closed-loop feed back system. For example, optimal output power from the wavelength conversion device 30 may be restored within a second or less of the bipod flexures 20 receiving current or voltage.

Figure 10:
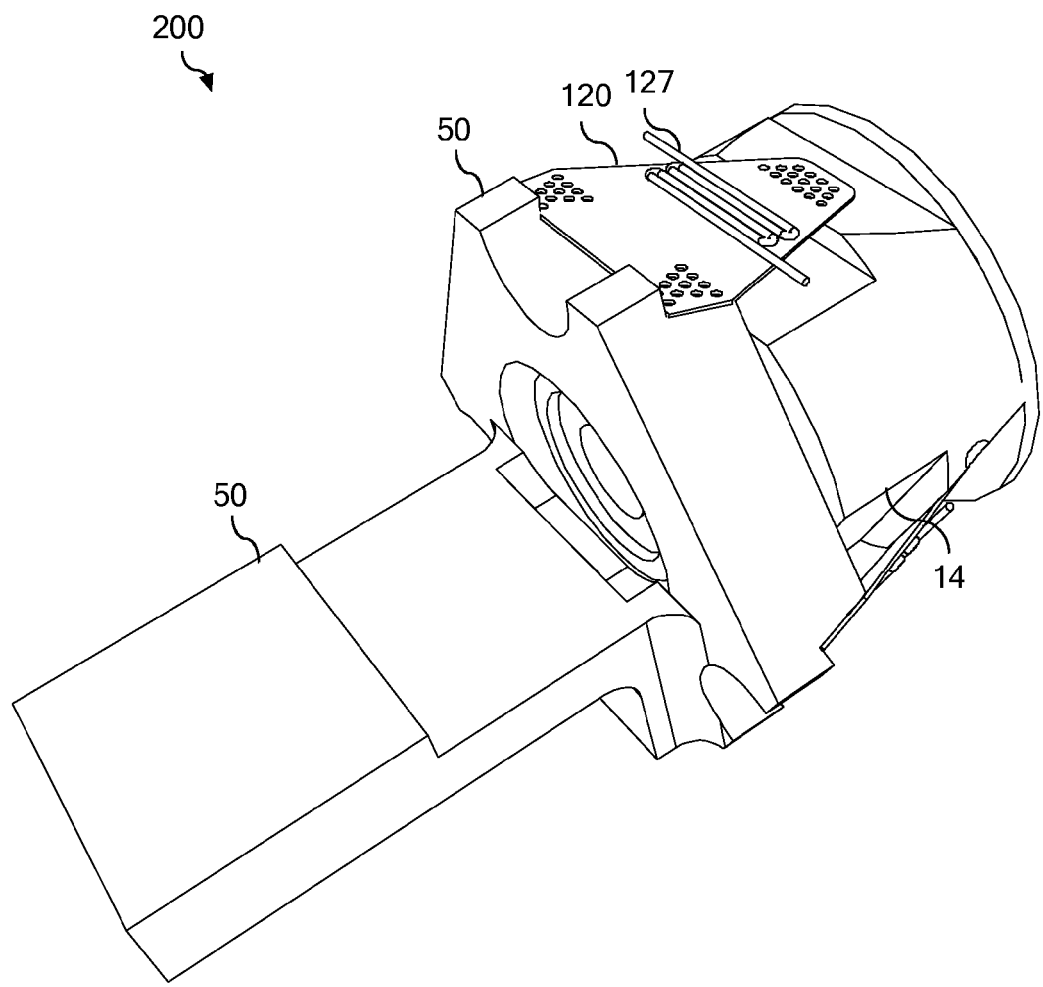
FIG. 10 is an illustration of an exemplary connecting structure according to one or more embodiments of the present disclosure.

Referring to FIG. 10, another connecting structure embodiment is illustrated. In this embodiment, each of the heated flexures are configured as a triangular flexure 120. The triangular flexures 120 may be made of a triangularly shaped sheet of flexure material capable of changing in length upon the application of heat. The triangular flexure 120 may further comprise a heating element 127. In the illustrated embodiment the heating element is configured as a wire 127 capable of generating heat with the application of current. As described herein with respect to the bipod flexures 20, the amount of heat provided to selected triangular flexures 120 via the heated wire 127 may be controlled to alter the position of the mirror and lens housing 14 with respect to the structure base 50 to optically align the beam spot with the waveguide input (not illustrated in FIG. 10). As mentioned above, the heated flexures of the present disclosure are not limited to the bipod flexure 20 and triangular flexure 120 configurations and may possess different configurations.

The selection of the flexure material for the heated flexures discussed above (e.g., bipod flexure 20 and triangular flexure 120) will now be described. As described above, when voltage or current is applied to the heating element, the temperature of the heated flexure becomes elevated and the respective lengths change in accordance with the coefficient of thermal expansion (CTE) of the flexure material. As each heated flexure is heated, it becomes longer, causing the mirror and lens housing assembly to move by a small amount, δ. By carefully controlling the electrical power applied to the heating element, the focal point of the lens and therefore the location of the redirected beam may be accurately and finely adjusted.

The temperature at the heating element is the highest, and the temperature at the ends of each heated flexure is the lowest. Energy (power) flows into the heating element as electricity, then from the heating element to the heated flexure as heat, then down the temperature gradient from the hottest part to the coolest. The power used to heat the flexure member may be related to the temperature in the flexure and the flexure length according to the equation for conductive heat transfer:

$$\dot{Q} = 2kA\frac{(T_1 - T_0)}{\frac{L}{2}} = 4kA\frac{(T_1 - T_0)}{L}, \quad (1)$$

where:
- $\dot{Q}$ is the electrical power consumed by the resistor in Watts.
- k is the thermal conductivity of the material (Watts/m^2·Kelvin),
- A is the cross sectional area of the heated flexure,
- $T_1$ is the temperature of the wire at the heating element (° C.),
- $T_0$ is the temperature at the ends of the heated flexure (° C.), and
- L is the length of the heated flexure (meters).

The displacement or cumulative effect of length change on the length of the heated flexure may be defined by:

$$\delta = 2\alpha \int_0^{\frac{L}{2}} (T - T_0) dL = \frac{1}{2} \alpha \cdot L \cdot (T_1 - T_0), \quad (2)$$

where T is the temperature of the heated flexure at a given point and α is the CTE of the flexure material (ppm/° C.).

Combining equations (1) and (2), a figure of merit for the power consumption of the heated flexure may be obtained, which is a ratio of the amount of displacement induced divided by the amount of power applied to the resistor:

$$\frac{\delta}{\dot{Q}} = \frac{1}{8} \cdot \frac{\alpha}{k} \cdot \frac{L^2}{A}, \cdot \quad (3)$$

This describes the amount of thermal expansion of the heated flexure induced by the electrical power applied to the heating element (i.e. microns/watt). For optimum results, it would be desirable to have a high value. It may be seen from equation (3) that the effectiveness of the flexure is related to the ratio of CTE to thermal conductivity (α/k), and to the dimensionless ratio of length squared to cross-sectional area. Therefore, a desirable aspect ratio for the flexure is a long, slender one. A desirable choice for material would be one with high ratio of CTE to conductivity (α/k). As examples of possible material choices, type 300 stainless steel provides an (α/k) value of approximately 1.0 micron/W and Corning Type 1737 glass with the same dimensions provides an (α/k) value of approximately 34 micron/W. It is noted that other materials may be utilized and embodiments of the present disclosure are not limited to the two material choices described herein.

An additional consideration for the selection of the flexure material is the elastic modulus of the material used (E, in megaPascals). A high stiffness material may be desired in order to rigidly hold the mirror and lens housing assembly 10 to the structure base 50. Hence there is a trade-off between choosing materials that may have high CTE to thermal conductivity ratios, but low stiffness. An additional figure of merit for an appropriate material choice may then become:

$$E \cdot \frac{\alpha}{k}, . \quad (4)$$

In the case of comparing stainless steel to glass, some of the factor of 34 advantage described above for the ratio of CTE to conductivity ($\alpha/k$) of glass may be compromised by the lower stiffness of glass. The result is that figure of merit ratio between glass and stainless steel is considerably less than 34, but may still be favorable for glass depending upon the application in which the heated flexures are utilized.

Figure 9:
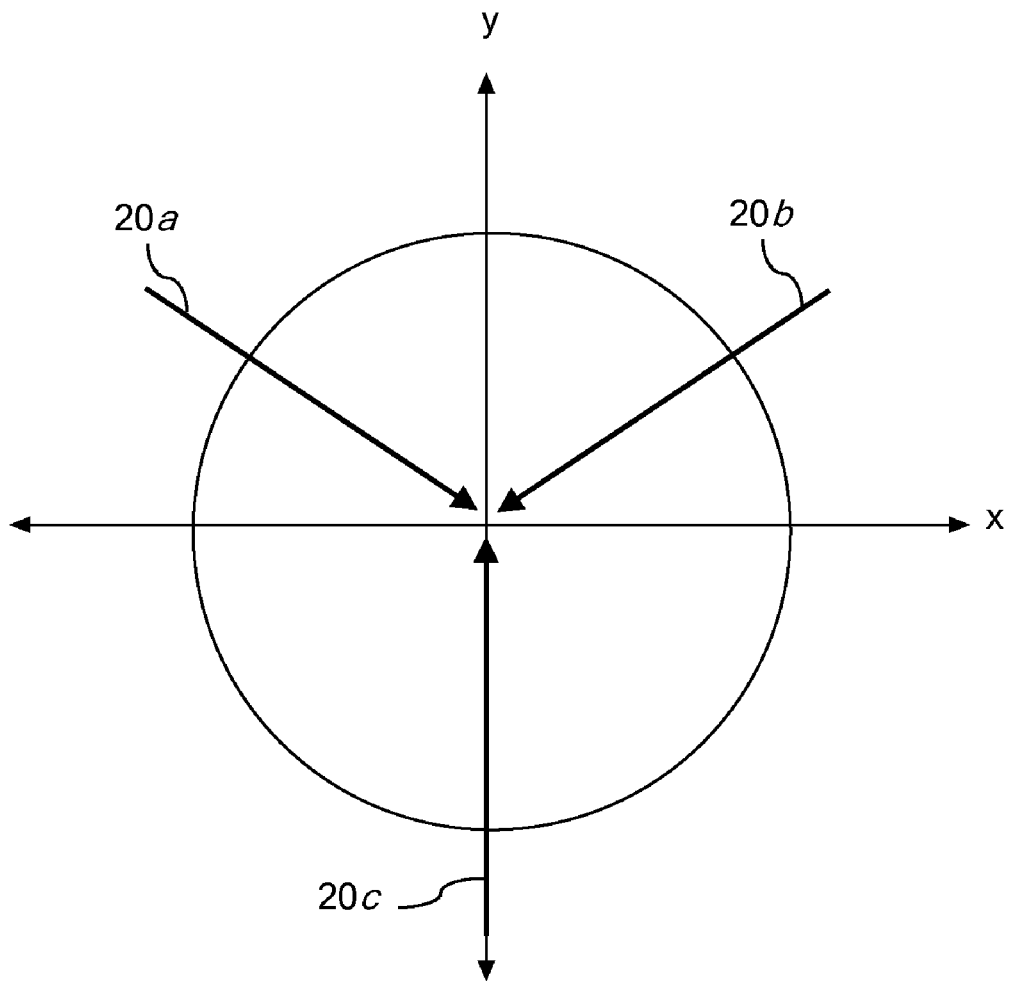
FIG. 9 is a schematic illustration of optical beam movement created by movement of exemplary bipod flexures arranged in a tripod configuration according to one or more embodiments of the present disclosure.

As illustrated in FIG. 9, each heated flexure (e.g., bipod flexure 20 or triangular flexure 120) produces radial motion of the laser beam in the plane of the crystal waveguide input in a direction correlated with the orientation of the specific bipod flexure. The configuration of the heated flexures about the optical axis is such that two of the heated flexures produce radial beam motion (represented by directional arrows 20a and 20b) of the redirected optical beam 44 at 30 degrees with respect to the system x-axis, while the third bipod flexure produces motion (represented by directional arrow 20c), solely along the system y-axis. In order to move the laser beam to a specific 120 degree sector illustrated in FIG. 9, only two heated flexure members need be used. The two heated flexures used are the flexures that drive motions of the beam that frame the 120 degree sector into which the beam motion is desired. In this manner, only two flexures are heated at any given time, thereby minimizing power consumption.

According to a tripod configuration of the bipod flexures 20, the flexure power efficiency may be, but is not limited to, 20 mW/micron. As is described in equations (3) and (4), further optimization of the flexure power efficiency may be realized by changes in the material choice for the flexures, as well as other considerations.

As described above, the heated flexures may be utilized to align one component to another component in assemblies or systems other than the optical package described herein. The heated flexures may allow for the otherwise imperfect positioning accuracy of a passive connection during assembly to be improved to the tolerance requirements defined by the particular application (e.g., one tenth-micron accuracy for green laser optical packages). The heated flexures may provide alignment of the components to be maintained during the lifetime of the device over a range of operation and environmental conditions. The heated flexures may be relatively inexpensive as highly reliable, as they may consist of very few components and moving parts.

It is noted that terms like "preferably," "commonly," and "typically," if utilized herein, should not be read to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the terms "approximately" and "substantially" are utilized herein to represent the inherent degree of uncertainty that may be attributed to any quantitative comparison, value, measurement, or other representation. The terms "approximately" and "substantially" are also utilized herein to represent the degree by which a quantitative representation may vary from a stated reference without resulting in a change in the basic function of the subject matter at issue.

It is noted that recitations herein of a component of the present invention being "configured" in a particular way, "configured" to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

The invention claimed is:

1. An optical package comprising, a laser, a wavelength conversion device, a mirror, and a connecting structure, wherein:
    the laser is configured to emit a laser beam incident upon the mirror;
    the mirror is configured to reflect the laser beam such that the laser beam is incident upon an input facet of the wavelength conversion device;
    the connecting structure comprises a structure base and three bipod flexures;
    each of the bipod flexures comprises first and second bipod legs extending from the structure base to the mirror and a heating element thermally coupled to the first and second bipod legs such that heat generated by the heating element changes the length of the bipod legs; and
    the bipod flexures are arranged in a tripod configuration such that changes in the length of the bipod legs of respective ones of the three bipod flexures alter the reflection of the laser beam from the mirror.

2. An optical package as claimed in claim 1 wherein the connecting structure comprises one or more additional bipod flexures and three of the bipod flexures define the tripod configuration.

3. An optical package as claimed in claim 1 wherein the input facet of the wavelength conversion device comprises a waveguide input and the changes in the length of the bipod legs of respective ones of the three bipod flexures align the reflected laser beam with the waveguide input.

4. An optical package as claimed in claim 1 wherein each of the bipod flexures further comprises one or more first mounting tabs coupled to the mirror and one or more second mounting tabs coupled to the structure base, wherein the first and second bipod legs extend from the one or more first mounting tabs to the one or more second mounting tabs.

5. An optical package as claimed in claim 4 wherein the heating element comprises a resistor.

6. An optical package as claimed in claim 5 wherein each of the bipod flexures further comprises a power tab coupled to the one or more second mounting tabs and a wire connecting the power tab to the resistor.

7. An optical package as claimed in claim 1 wherein the bipod legs of each bipod flexure comprise Type 300 stainless steel or Corning Type 1737 glass.

8. An optical package as claimed in claim 1 wherein the optical package further comprises a lens configured to focus the laser beam that is reflected off of the mirror onto the input facet of the wavelength conversion device.

9. An optical package as claimed in claim 8 wherein the lens is further configured to collimate and direct the laser beam toward the mirror.

10. An optical package as claimed in claim 8 wherein the lens is rigidly coupled to the mirror such that the changes in the length of the bipod legs of respective ones of the three bipod flexures moves the lens in conjunction with the mirror.

11. An optical package as claimed in claim 1 wherein:
the three bipod flexures define three 120 degree sectors about an optical axis; and
the tripod arrangement of the bipod flexures is such that a selected two of the bipod flexures move the position of the reflected laser beam into a selected one of the three 120 sectors upon activation of the selected two of the bipod flexures.

* * * * *